Oct. 18, 1966  E. CAPPELLARI  3,279,108
REMOTE CONTROL DISPLAY SYSTEM
Filed March 3, 1964  3 Sheets-Sheet 1

Oct. 18, 1966  E. CAPPELLARI  3,279,108
REMOTE CONTROL DISPLAY SYSTEM
Filed March 3, 1964  3 Sheets-Sheet 2
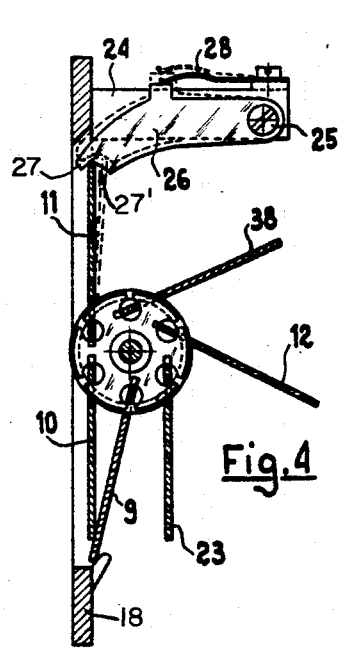
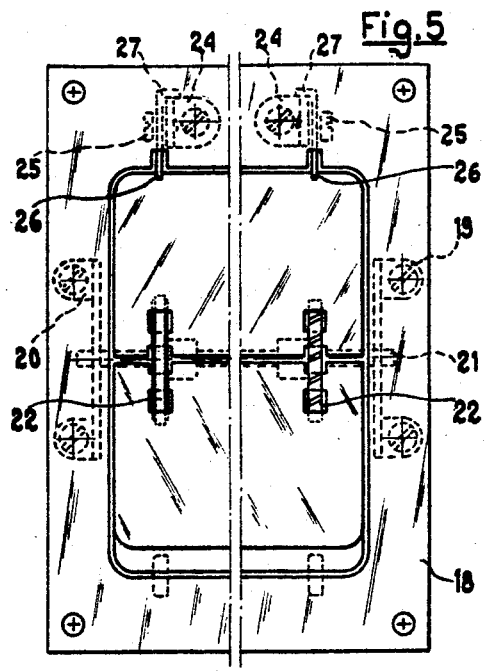
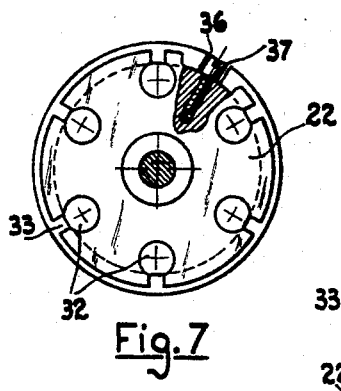
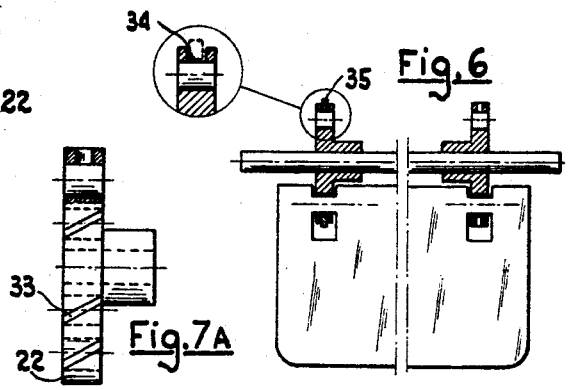
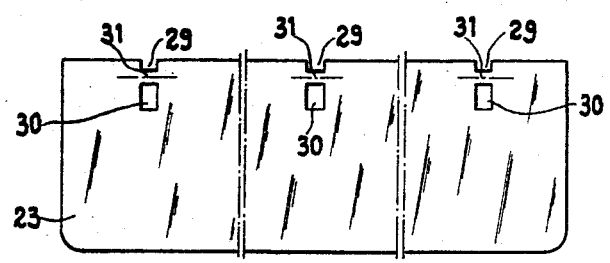

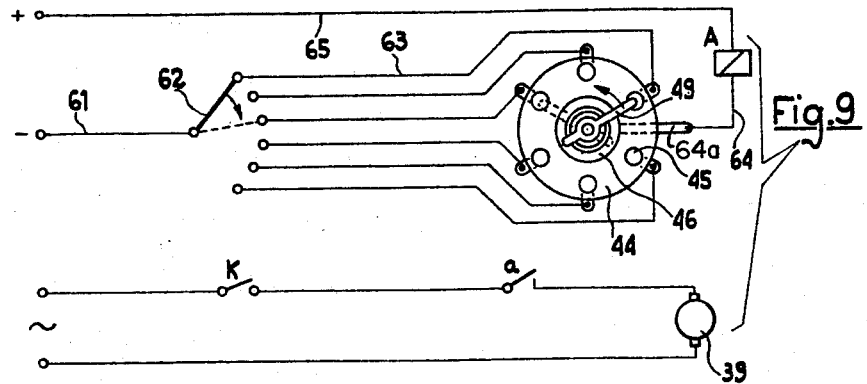
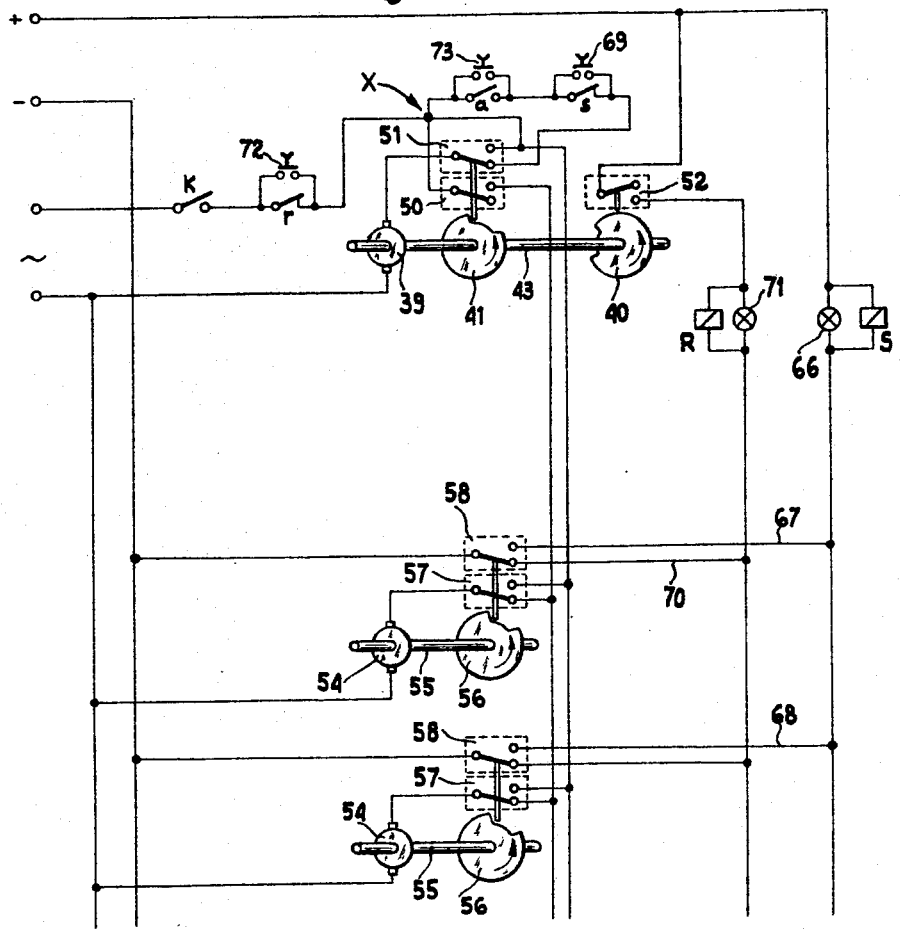

3,279,108
REMOTE CONTROL DISPLAY SYSTEM
Elio Cappellari, Milan, Italy, assignor to Enrico Boselli S.p.A., Milan, Italy, an Italian joint-stock company
Filed Mar. 3, 1964, Ser. No. 349,081
Claims priority, application Italy, Mar. 21, 1963, 5,760/63
7 Claims. (Cl. 40—35)

This invention relates to teleindicators of the kind consisting of a plurality of drums which are hinged about a central axis, and are operated by an electric motor, which controls the position of the first drum, all others being controlled by the first one. As already well known teleindicating devices, a number of remote control elements, carrying all the same indication, are caused to rotate by electromagnets; which are in turn simultaneously energized by pulses coming from a central control station.

An object of this invention is to provide a system by which only the first of a plurality of elements carrying all the same indication, is operated, while all other elements are forcibly caused to rotate synchronously with the first one by means of a self-control system.

A feature of the invention consists in the use of conventional A.C. synchronous motors for the operation of the hinged drums.

The invention may be utilized in many types of devices of which those that follow are merely indicative and are not restrictive. Such devices include devices for indicating the departure and arrivals of trains or aircraft; data and names indicating devices for races and sport competitions; devices for calling persons in large workshops, and the like.

Further objects and advantages of the invention will be better appreciated from a consideration of the following description of a preferred embodiment thereof, taken with the accompanying drawings, in which:

FIG. 1 diagrammatically shows a teleindicator device.

FIG. 4 is a partial section of FIG. 5.

FIG. 5 shows a plurality of indicating plates that are hinged for movement about a horizontal axis.

FIG. 6 shows an axle and supporting end disks of one plate only hinged thereon.

FIGS. 7 and 7A are enlarged views of the structural details of a supporting end disk.

FIG. 8 is a view of an indicating plate.

FIGS. 9 and 10 show wiring diagrams for the device according to the invention.

Figure 1:
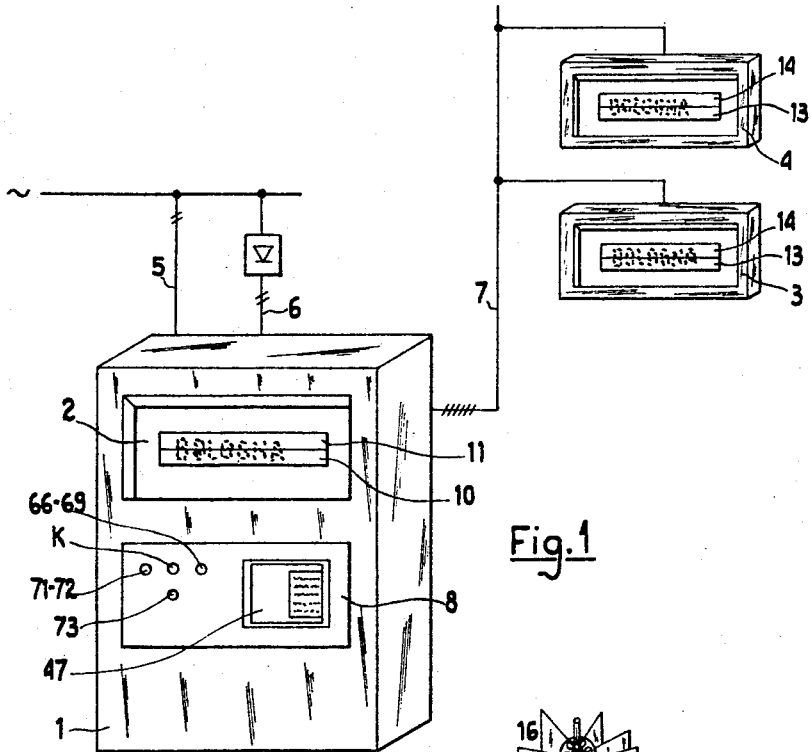

Referring now to the drawings, and in particular to FIG. 1, there is shown a teleindicator device comprising a control central desk 1, including a check panel 2, which is in sight of the operator, and one or more, remote controlled indicator boards 3 and 4. The control desk is connected to an A.C. power source by feed lines 5 and 6, and desk 2 and boards 3 and 4 are connected by line 7.

All control and check instruments are fitted on a panel 8, which in turn is fitted in the control desk 1.

Plates 10 and 11 carry information in the form of numbers and inscriptions that are to be exhibited by means of control pulses that are sent from the panel 8, the plates 10, 11 being visible through a window of check panel 2.

Similarly, plates 13 and 14, carrying the same information as plates 10 and 11 of check panel 2, will appear in the windows of indicator boards 3 and 4.

Said plates 10 and 11, and similarly the plates 13 and 14 form part of a plate drum or roller, that may be positioned either vertically or horizontally.

Figure 3:
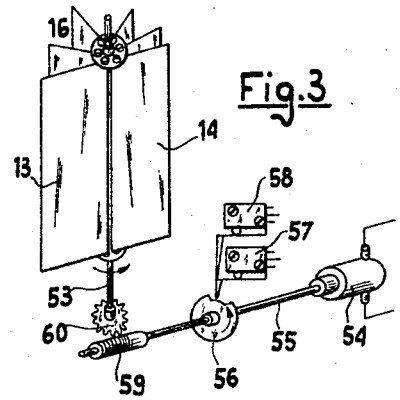
FIG. 3 shows a plurality of hinged indicating plates with related driving devices, and control of a positively operated type.
Figure 2:
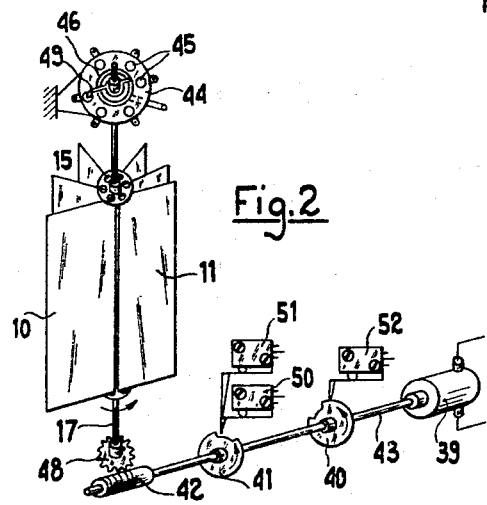
FIG. 2 shows a plurality of hinged vanes or plates, with related driving devices and pilot type control mechanism.

FIG. 2 shows a vertically disposed plate drum 15 with all the required control and drive mechanisms, as utilized in the check panel 2, while FIG. 3 shows a plate drum 16, also with all the required control and drive mechanisms, as utilized in the indicator boards 3 and 4.

Vertical axis plate drums are already well known, whereby detailed description thereof can be dispensed with.

It may be observed, however, that, to have the next pair of plates brought in sight in the board windows, the axis of drum 17 shall make a rotation of $360/n$ degrees, wherein $n$ are the number of plates.

When the axes of plate drums are horizontally arranged, the same control and driving mechanisms as shown in FIG. 2 are utilized. However, since large and heavy plates are usually employed, then the mechanisms shown in the FIGS. 4 to 8 are suitable for such horizontal arrangement.

A drum may comprise any number of plates, consistent with mechanical realization.

FIGS. 4 and 5 show a six-plate drum comprising a dial board 18, with which are fast two supporting brackets 19 and 20 rotatably supporting a shaft 21. Two end disks 22 are keyed on the shaft 21, and are formed with suitably located holes, wherein six plates 9, 10, 11, 12, 23, 38 are hinged. Such plates appear in pairs in the window of indicating board 18. Two supporting brackets 24 support a pin 25 on which is mounted a pawl 26, formed with an indexing beak 27 and urged downwardly by a spring 28.

Each plate is a metal or plastic flat sheet and, as shown in FIG. 8 is formed with two or more notches 29 and adjacent windows 30, thereby forming an intermediate bridge-like segment 31, the middle line of said segment being the rotation axis of the plate.

The end disks 22 are formed with 6 holes 32, and with 6 radial notches 33, having a width slightly larger than the thickness of the plate. The end disks also have groove 34, wherein a ring 35 of steel or other elastic material is slidingly fitted.

Said elastic ring 35 does not extend over the whole plate circumference, but is formed with a notch 36 that, when brought in coincidence with the successive disk notches 33, allows the plates to be fitted in the bridge segments. After all the plates have been fitted in place, further rotation of ring 35 is positively prevented by a screw 37, that is introduced through the notch 36 and is secured with disk 22. In under such a condition, all notches 33 of the disk 22 are closed.

Said disks 22 may also be formed in one piece (see FIG. 7A) by cutting notches 33, inclined at about 25 degrees in respect of shaft 21, near the holes 32; then, the plates can be fitted in place by slightly bending them, due to the resilience of their material.

The bridge-like segments 31 of the plate, after having been fitted into the holes 32 of the disks in the above-stated manner, will become supporting and journalling elements for the plates. After the drum has been wholly assembled, the plates will assume the arrangement as shown in FIG. 4, with the side of windows 30 resting against the outer contour of the elastic ring 35, whereby the plates, when the shaft 21 is indexed, are successively brought in their vertical position.

The depth of the small window 30, with which the plate is formed, must be such that both plates 10 and 11, when positioned side by side on the front of board 18, will lie in the same plane. To prevent the machining of such a window with too high accuracy, a notch 27′, having sides inclined at about 90 degrees, is cut near the forward end of pawl 26, thereby assisting the accurate centering of the upper plate.

At each indexing of the drum, i.e. each time the shaft 21 is turned by 30 degrees a new indication will appear on the indicating board 18 as follows. After the shaft has been turned for about 5 degrees, the plate 11 will disengage itself from the pawl 26, and since in the meantime it has been brought beyond its vertical position, the plate will rotate due to its own weight through an angle of about 180° and finally take the place of the preceding plate 10, at the end of the 30° indexing movement of shaft 21.

Simultaneously the plate 38 is advanced until taking the place formerly occupied by the plate 11, and a new indication shall appear for this pair of plates.

As shown in FIGS. 5 and 6, any possible axial shifting of the plates is prevented by the disks 22 which engage the windows 30.

Usually, two disks and two windows will be sufficient for a plate drum. When very long plates are used, three or more disks may be needed, with as many notches and windows on the plates (see FIG. 8).

As shown in FIG. 2, the shaft 17 of plate drum 15 is driven by means of a small and preferably synchronous motor 39 having a shaft 43 on which are fitted cams 40 and 41 and worm 42. Worm 42 is in mesh with a worm wheel 48 that is keyed on the shaft 17 and provides a transmission ratio of 1:6.

Each turn of the shaft 43 of motor 39 causes the plate drum 15 to be indexed by one pitch (i.e. by 30°), and a new indication will appear on the dial of panel 2 (see FIG. 1).

A disk 44, made of an insulating material, and formed with a central hole, concentric with the shaft 17, is fast with the indicator board of plate drum 15.

Six silver contacts 45 and one copper ring are secured to said disk, while a contact spring 49, made of an electrically conducting material, and having two arms of different length, is fastened by means of an insulating bush, onto the shaft 17, in such a manner that the longer arm of contact spring 49 is kept in contact with one of the contacts 45, while the shorter arm rests against the ring 46.

Said contacts are located all along the same circular arc, and are spaced 30 degrees from one another. Consequently, at each indexing of drum 15, the contact spring 49 is shifted from a contact 45 to the next one, thereby closing a new circuit.

Cams 40 and 41 are similar, but are shifted about 115° from one another. The cam tracks thereof have a reduced diameter portion having an angular amplitude of about 45° whereby a switching operation is effected on a lever of a microswitch, acting as a cam follower.

In more detail, two microswitches 50, 51 are simultaneously engaged with cam 41, while microswitch 52 is engaged with the cam 40.

Similarly, as shown in FIG. 3, the shaft 53 of drum 16, by which the indications are given on the boards 3 and 4, is driven by a small and preferably synchronous motor 54. Two microswitches 57 and 58 are engaged with a cam 56, that is keyed on the shaft 55 of said motor 54. Also keyed on said shaft is a worm 59, which is in mesh with worm wheel 60, which is in turn keyed on the shaft 53 and provides a transmission ratio of 1:6.

The cam 56 is similar to cam 41 (see FIG. 2), and is in phase therewith.

Upon each turn of shaft 55, the plate drum will be indexed by one pitch (i.e. 30 degrees), and a new indication shall appear on the dials of boards 3 and 4.

Now, referring to the wiring diagrams as shown in FIGS. 9 and 10, where the mechanical elements are also shown where needed, the case in which the plate drum 15 only, appearing in the check panel 2 of the control desk, is to be operated, will be firstly considered.

Before the operation is started, the inscription "Bologna" is for example shown by the plates 10 and 11; a relay A is in its on position (since, as shown in the diagram of FIG. 9, the negative pole is connected with the winding of said relay A through the lead 61, the hand operated changeover switch 62, the lead 63, the spring contact 49, a wiper 64a and the lead 64, while the positive pole is connected with same winding through the lead 65), and the related contact a, in the A.C. circuit of motor 39 is open.

Now, by shifting the lever of changeover switch 62, e.g. for two steps (as shown in broken lines) the relay A will drop out, whereby the related contact a is closed. Now, by closing the starting switch K, a voltage is applied to motor 39, whereby it is started, thus driving the shaft 17 of plate drum 15.

After the latter shaft is indexed by two steps, the circuit of relay A will be again closed by the contact spring 49, thus opening the contact a, which results in the stopping of motor 39.

The plate drum 15 is thus brought in the required position.

Obviously, other control or preselecting devices, by which the same action is performed, may be substituted for the hand-operated changeover switch 62. A perforated card reader 47, as diagrammatically shown on panel 8 of the control desk, may be utilized for the above purpose.

Should all the three plate drums of panel 2, and of boards 3 and 4, be simultaneously operated from the control desk, then the plate drum 15 of panel 2, together with the driving and control mechanisms 40, 41, 50, 51 and 52, would act as a "pilot" for the plate drums 16 as shown in FIG. 3, which are in turn fitted with the control devices 56, 57 and 58, and which will therefore be hereinafter called "driven" drums.

In such a case, the wiring diagram as shown in FIG. 10 is suitable. Therein is shown the contact a, and the switch K, which operate in the same manner as previously described, whereby description of their operation can be dispensed with.

Let us assume that the drums of the pilot group in the panel 2, and the plates of both driven drums in the boards 3 and 4, are to be indexed, again for two steps.

By shifting the lever of 62 into the position as shown in broken lines, the relay A will drop out, and the related contact a is closed whereby, after the switch K is also closed, a voltage is applied to motor 39 (one pole of the A.C. current is directly connected therewith, while the other pole is connected with said motor through K, r, a, S, and the microswitch 51) which is thereby started.

After an angular motion of about 45 degrees, by the shaft 43 of motor 39, the microswitches 50 and 51 are tripped by the cam 41 in a position opposite to that as shown in FIG. 10.

At this moment, the motors 54 (with which one pole of the current is directly connected, while the other pole is connected therewith through K, r, the microswitch 50 and the microswitch 57) are also started, and after a rotation of about 55 degrees by the shaft 55, both microswitches 50 and 57 are tripped by the cam 56 in a position opposite to that as shown in the drawing.

As a consequence thereof, the pilot lamp 66 is lighted, and the relay S is activated (being the positive pole connected directly therewith, while the negative pole is connected through the microswitch 58 and the lead 57, or through the second microswitch 58 and the lead 68) thereby opening the contact S. This contact is then kept open until a complete turn (360 degrees) is accomplished by both cams 56 on the shafts 55.

As already stated, the cam 41 on the shaft 43 of motor 39, is positioned with a lead of about 45 degrees in respect of both cams 56 of motors 54, whereby after a complete revolution, the motor 39 is stopped, until a complete turn is made by both cams 56 of fractional motors 54, since the contact S is kept always open until such moment.

It must be noted that—as clearly shown in the wiring diagram—when switches 51 and 57 are in their switched positions, the voltage is fed to motors 39 and 54 through a common lead, that passes through K and r only (which will hereinafter be called "self-excited position") whereby, if one of the latter contacts are not open, said motors will continue to operate until a complete turn is accomplished by the cams 41 and 56, that are respectively fitted on their shafts.

As regards motor 39, since the microswitch 51 is already in the self-exciting position, no effect is caused by the energization of relay S, and thus by the opening of contact s, until a complete turn is accomplished by the cam 41; however, at that moment, due to a shifting of 50 degrees in the initial position, one of the leads by which the motor is fed, is interrupted by the opening of contact s, whereby said motor 39 is stopped.

When a complete turn is accomplished by both shafts 55 of motors 54, both microswitches 58 will be tripped back in their positions as shown in the drawing, whereby the relay S drops out and the contact s is closed again.

In the meantime, due to an indexing by 30°, the contact spring 49 is also advanced by 30°; however, in this new position, no voltage coming from the pole is yet present, whereby the contact a still remains closed.

After the relay S is deactivated, the contact s is closed again; voltage is once more applied to motor 39, whereby it is started again, to accomplish a further complete turn, thus causing, through the above stated means and in the already stated manner, also the motors 54 to be started and to accomplish a further complete turn.

*First automatic control: One motor stops itself after having been started*

By assuming now that one of the motors 54 is stopped, due to trouble of any nature, e.g. of mechanical nature, after a rotation of 180° only; then the relay S will remain in its on position, the pilot lamp 66 will remain lighted and the whole system is stopped.

To prevent the operator from suspending operation of all other parts of the device that are yet operating, a timed pushbutton 69, parallel connected with s is provided. By such pushbutton, the relay S is deactivated and it can be operated by the operator, after the trouble has been detected.

By having recourse to a pushbutton fitted with pilot lamps, wherein the functions of 66 and 69 are combined, it will be sufficient for the operator to depress the pushbuttons with the pilot lamp yet lighted.

*Second automatic control: One of the two motors 54 is not started*

Should one of the two motors 54, indicated in the upper section of the wiring diagram, fail to start after the microswitch 50 is tripped, then after a rotary motion of about 245° has been accomplished by the shaft 43, the microswitch 52 is tripped by the cam 40 back to a position opposite to that shown in the drawing, whereby the relay R is activated (the negative pole being connected through the microswitch 58 and the lead 70, while the positive pole is connected with said relay through the microswitch 52) and the pilot lamp 71 on the control desk panel is lighted.

The energization of relay R, and thus the opening of its contact r, results in the interruption of one feed pole either to motor 39, and to two motors 54, whereby the entire device is put out of operation.

A timed pushbutton 72, parallel connected with the contact r, can be depressed by the operator at the control desk, to get the required indication from the operating elements. Even in this latter case, when a pilot lamp 71 is employed with the pushbutton 72, the operator, after having detected the trouble, shall depress the pushbutton 71, which control lamp is yet lighted.

Assuming that all the three motors are in their proper operating conditions, then the motor 39 is firstly stopped, and after a short time both motors 54 will be also stopped.

After a second whole turn is accomplished by the shaft 43 of motor 39, the contact spring 49 is indexed by 30 degrees, thus taking the position as shown with broken lines in the FIG. 9, thereby causing the energization of relay A, the opening of a, and thus the stopping of the operation of the remote controlled drums, by which the required position has been attained.

*Step-by-step manual operation*

To have all the three plate groups indexed a step at a time, it will be sufficient to provide a timed pushbutton 73, in parallel with the contact a: when switch K is in its on position, each time the pushbutton 73 is depressed all the three plate drums will be advanced by one step in a manner similar to that already described. The time for which the pushbutton 72 is kept depressed shall be such as to allow the shaft of motor 39 to accomplish one half of a turn. The remaining half turn will be accomplished by the action of the self-exciter contact.

In the preceding description, a zero starting time, and an instantaneous stopping of motors and an also zero pick up time of relays R and S have been assumed for the sake of simplicity. In practice, such times depend on the mechanical and electrical features of said devices, and due account must be taken thereof when high operating speeds are required.

Again for the sake of simplicity, a cam and microswitch have been shown as a control system, but it must be understood that the same function can be attained by transistorized circuits and by the use of detecting devices (e.g. a photocell) as well known by those skilled in the art.

The invention has been illustrated and described on the basis of a preferred embodiment, but it shall be understood that many changes and modifications may be made therein, which will fall within the scope of the attached claims.

What I claim is:

1. In a remote control display system having one master unit and a plurality of slave units wherein each unit is provided with a display panel, a drum type display apparatus and an electric motor adapted for rotating the associated drum in step-by-step controlled manner, and means for controllably supplying electrical energy to the motor associated with said master unit; the improvement comprising first cam means connected for rotation with the latter motor, first and second switch means coupled with said cam means for being activated in a first and in a second portion of a complete revolution of said first cam means; further cam means individually connected with each motor of said slave units, further switch means coupled to said further cam means for being activated thereby; a power supply circuit having a lead connected to one terminal of each motor in all units, and a second lead connected to the other terminal of said motor associated with the master unit, said second switch means being connected in said second lead and closing the same with said first cam means in the first portion of rotation thereof, a first connection between said lead and the other terminal of each motor in said slave units, said second switch means being connected in said first connection and closing the same with said first cam means in the second portion of rotation thereof, said further switch means being connected in said further connection and closing the same in the first portion of rotation of said further cam means, and a second connection between said second lead and the other terminal of each motor of the sleve units, said further switch means being connected in said second connection for closing the same with said further cam means in the second portion of rotation thereof, whereby said motor of the master unit is energized during said first portion of rotation of said first cam means and then completed through switching of said second switch means until completion on one revolution, while each motor of said slave units is activated through said first connection, said first switch means and said further switch means during the first portion of rotation of said further cam means and then through said second connection and said further switch means during the second portion of rotation of said further cam means.

2. In the system of claim 1 additional switch means actuated by said further cam means in each slave unit, a coil operated switch means connected to the supply means, and a safety circuit connected to the coil of said coil operated switch means via said additional switch means for opening said safety circuit as each said further cam means completes its one revolution, whereby reactivation of the motor of said master unit is prevented until completion of one revolution by each of the cam means of said slave units.

3. In the system of claim 2 comprising third cam means connected to said motor of master unit, third switch means in said safety circuit coupled to said third cam means, said third cam means having a cam surface to cause completion of said safety circuit during a part of said second portion of revolution of said first cam means, whereby the supply of said motors of the slave units is terminated upon energization of said coil if said first cam means has not completed its one revolution thereby preventing reactivation of said motors of said slave units if said one revolution has not been completed.

4. In the system of claim 1 comprising operator-controlled switch means in said second lead for controlling the electrical supply to said motor of the master unit.

5. A remote control display system comprising a master unit and a plurality of slave units, each unit including a drum type display apparatus and a motor for driving the respective said apparatus in stepped fashion, cam means coupled to each motor to be driven thereby, a motor supply circuit wherein all said motors are in parallel connection, and a control circuit including first switch means coupled to the cam means of the master unit and connected in said control circuit for completing the same to energize the motors of the slave unit when the master unit is energized and second switch means actuated by said cam means of said slave units and connected in said supply circuit and in said control circuit to prevent reactivation of said master unit until completion of one rotation of each slave unit as caused by the preceeding activation of said master unit.

6. A system as claimed in claim 5 comprising operator-controlled switch means in the supply circuit.

7. A system as claimed in claim 5 comprising further cam means driven by the motor of the master unit and means in said supply circuit and acted on by the third cam means for interrupting supply of current to the motors of the slave units and preventing reactivation thereof if said motor of the master unit has failed to complete its previous revolution.

References Cited by the Examiner

UNITED STATES PATENTS

| 1,810,606 | 6/1931 | Houck | 40—35 |
| 2,736,113 | 2/1956 | Morrison | 40—76 |
| 2,765,552 | 10/1956 | Schafly | 40—53 |
| 3,192,656 | 7/1965 | Christensen | 40—52 |

FOREIGN PATENTS 628,819  4/1936  Germany.

EUGENE R. CAPOZIO, *Primary Examiner.*

WILLIAM GRIEB, *Assistant Examiner.*